US006485548B1

(12) United States Patent
Hogan

(10) Patent No.: US 6,485,548 B1
(45) Date of Patent: Nov. 26, 2002

(54) METHOD AND APPARATUS FOR CLEANING A GAS

(76) Inventor: J. S. Hogan, 1742 Country Club Dr., Sugar Land, TX (US) 77478-3906

( * ) Notice: Subject to any disclaimer, the term of this patent is extended or adjusted under 35 U.S.C. 154(b) by 0 days.

(21) Appl. No.: 10/085,830

(22) Filed: Feb. 28, 2002

Related U.S. Application Data

(63) Continuation of application No. 09/900,828, filed on Jul. 6, 2001, now Pat. No. 6,391,100.

(51) Int. Cl.⁷ .............................................. B01D 471/10
(52) U.S. Cl. .............................. 96/282; 96/284; 96/323; 261/DIG. 54
(58) Field of Search ..................... 95/216, 219; 96/268, 96/270, 275, 281, 282, 284, 323

(56) References Cited

U.S. PATENT DOCUMENTS

| 2,200,891 A | * | 5/1940 | Nyborg |
| 2,395,526 A | * | 3/1946 | Nilsson |
| 2,941,872 A | * | 6/1960 | Pilo et al. |
| 3,005,515 A | * | 10/1961 | Caddell |
| 3,149,935 A | * | 9/1964 | Jamison et al. |
| 3,321,191 A | * | 5/1967 | Najarian |
| 3,379,422 A | * | 4/1968 | Liesenhoff |
| 3,385,030 A | * | 5/1968 | Letvin |
| 3,448,562 A | * | 6/1969 | Wisting |
| 3,517,485 A | * | 6/1970 | Dell'Agnese et al. |
| 3,524,631 A | * | 8/1970 | Mare |
| 3,581,467 A | * | 6/1971 | Donnelly |
| 3,789,585 A | * | 2/1974 | Arnold et al. |
| 4,478,616 A | * | 10/1984 | Jarvenpaa |
| 4,514,194 A | * | 4/1985 | Jarvenpaa |
| 4,594,081 A | * | 6/1986 | Kroll et al. |
| 4,762,538 A | * | 8/1988 | Michler et al. |
| 4,874,400 A | * | 10/1989 | Jury |
| 5,076,819 A | * | 12/1991 | Sharrow |
| 6,042,636 A | * | 3/2000 | Aishima et al. |

FOREIGN PATENT DOCUMENTS

FR 1424981 * 2/1965

* cited by examiner

Primary Examiner—Duane S. Smith
(74) Attorney, Agent, or Firm—Winstead Sechrest & Minick PC; Henry L. Ehrlich

(57) ABSTRACT

A system and method of scrubbing gas utilizing a liquid to wet a gas stream is provided. The scrubber comprises a container containing a liquid; a tube having a tube inlet opened exterior of the container connected via a throat to a tube outlet allowing a gas to flow from exterior the container into the space above the liquid; a motor having a rotatable shaft; a siphon pipe connected to the rotatable shaft having a siphon inlet disposed below the liquid surface and a siphon outlet positioned above the surface proximate the tube throat; wherein the rotating siphon pipe draws and rotates the liquid through the siphon pipe into the tube throat drawing the gas into the throat mixing with and scrubbing the gas; and a second opening in the container for discharging the scrubbed gas from the container.

20 Claims, 15 Drawing Sheets

METHOD AND APPARATUS FOR CLEANING A GAS

RELATED APPLICATIONS

This application is a continuation and claims benefit of priority of U.S. patent application Ser. No. 09/900,828, filed Jul. 6, 2001 and entitled Method and Apparatus for Cleaning Gas, now U.S. Pat. No. 6,391,100 issued May 21 2002.

TECHNICAL FIELD

The present invention relates generally to the field of cleaning a gas stream and more particularly to a method and apparatus for removing particulates and absorbing undesired gases from a gas stream and emitting a cleansed gas by mixing a gas with a liquid in an economical manner.

BACKGROUND INFORMATION

It is very often desirable to clean a gas stream of particulates and/or undesirable gases. Some gases, such as industrial emissions, must be cleansed or scrubbed until the emission meets legally regulated standards to be emitted into the atmosphere. Car emissions must meet legal standards, at least once a year. It is also becoming more desirable and popular to clean air in domestic settings. In fact, there are studies indicating that indoor pollution may be as great, if not a greater risk, to the individual health than outdoor pollution.

Indoor air quality is made worse by the fact that is usually entrapped and recirculated in structures that are sealed to a greater extent than in the past for energy saving reasons. The air which we inhale and exhaled is continually picking up particulates and becoming more comprised of other gases such as carbon dioxide and carbon monoxide in proportion to the oxygen and nitrogen content of the air. Domestic pollution is becoming an increasing health hazard seriously effecting the young an old, those with respiratory problems, asthma and allergies. Some of these irritants and pollutants include, but are not limited to, allergens such as pollen, mold spores, pet dandruff and dust, and gases such as carbon dioxide, carbon monoxide and naptha. Additionally, the surrounding air contains bacteria, viruses and odors that are undesirable.

Several methods are currently used to attempt to clean or partially clean gases such as air in a domestic setting. One of the most common methods of "cleaning air" is the utilization of filter systems. Typical filter systems for domestic use utilize a fan to circulate air from the environment through a mesh filter and at times through an additional charcoal source to absorb odors. These systems are very limited in the particulate size that is removed and only mask odors without addressing gases included in surrounding air. For these prior art systems to be even limitedly efficient it is required to frequently replace and/or clean the filters.

Other current and prior art air cleaning devices include electrostatic devices that electrically charge particles for capture. Again, this cleaners are very limited what is removed and the quantity of removal of particulate. Another drawback with electrostatic cleaning devices is that the charged dust particles that are emitted excessively collect on furniture, drapes, blinds, frames and the like.

Another type of gas cleaner requires the use of a venturi for scrubbing the gas. A venturi gas scrubber is a wet scrubber effective for removal of noxious gases, fumes, odors, particles and dust from a gas stream. Essentially, these type of scrubbers utilize a high velocity motive fluid stream passed through a constricted area to mix the gases with the motive fluid, absorb the selected gases and wet the small particulates for removal. The motive stream and mixed gas are impacted dropping out the particulates. Additionally, the undesired gases and odors are eliminated through absorption or chemical reaction between the undesired gases and the motive or scrubbing fluid. Passing the carrying gas through a mechanical cyclone may eliminate the particles. The primary deficiency in these type gas scrubbers is the pump. The pump required for the motive fluid is expensive, bulky and noisy.

It is therefore a desire to provide a method and apparatus for cleansing a gas utilizing a gas scrubbing system that reduces the pump requirements for a quantity of gas to be scrubbed. It is a further desire to eliminate the requirement of a conventional pump while mixing a liquid with a gas for scrubbing the gas.

SUMMARY

A system and method of cleansing a gas of undesired particulate, aromas, and gases of the type utilizing a liquid to wet a gas stream is provided. The gas scrubber of the present invention including a container having a bottom wall and a top wall interconnected by a side wall containing a liquid having a surface forming a space between said surface and said top wall; a tube mounted through the top wall, the tube having a tube inlet opened exterior of the top wall connected via a throat to a tube outlet disposed in the space, the tube allowing a gas to flow from exterior the container into the space; a motor having a rotatable shaft, the motor positioned above the top wall, the shaft extending through the tube; a siphon pipe connected to the rotatable shaft, the siphon pipe having a siphon inlet disposed below the liquid surface and a siphon outlet positioned above the surface proximate the tube throat; wherein the rotating siphon pipe draws and rotates the liquid through the siphon pipe into the tube throat drawing the gas into the throat mixing with and scrubbing the gas; and a second opening formed through the container for discharging the scrubbed gas from the space exterior of the container. Undesired gases are removed from the original stream by absorption in the liquid and particulate is dropped out of the gas stream after being wetted by the liquid.

The gas scrubber may include a rotatable fan wheel attached to the shaft, the fan wheel being positioned proximate the tube inlet to introduce additional gas through the tube and into the tube throat.

The gas scrubber may further include a screw propeller attached to the shaft to rotate therewith, the propeller having blades, each having a top leading edge and a bottom trailing edge interconnected by a face with the top leading edge positioned proximate the tube inlet for introducing additional gas down the face into the tube throat.

The gas scrubber may include blades attached to a top, outside portion of the siphon pipe, each of the blades having a top leading edge and a bottom trailing edge interconnected by a face that tangentially encircles the siphon pipe; the top leading edge positioned proximate the tube inlet and the bottom trailing edge positioned proximate the throat; the siphon pipe outlet positioned proximate the top leading edge of each blade such that liquid flowing out of the siphon pipe outlet flows across the face and the rotating face forces the gas and liquid down the face to mix the liquid and gas and forcing the mixture down and centrifugally off the trailing edges through the throat to further mix and scrub the gas with the liquid in the throat.

The discharged mixture drops out particulate and the liquid absorbs selected gases. The cleansed gas may then be released to the atmosphere. The partially cleansed gas may be routed through a separating device such as mechanical cyclone to drop out additional particulate and entrained liquid.

It should be realized in conjunction with the description of the device that various elements of the invention may be utilized in numerous combinations to achieve the desired results of the invention. For example, and not for limiting purposes, the system may utilize an oblong nozzle and oblong throat in combination with a conventional pump, reducing the pumping requirements typically required by prior art devices for the same amount of gas to be cleansed and liquid for cleansing. Additionally, the conventional pump may be eliminated by use of the siphon pipe singularly or in combination with other elements described.

The foregoing has outlined rather broadly the features and technical advantages of the present invention in order that the detailed description of a preferred embodiment of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
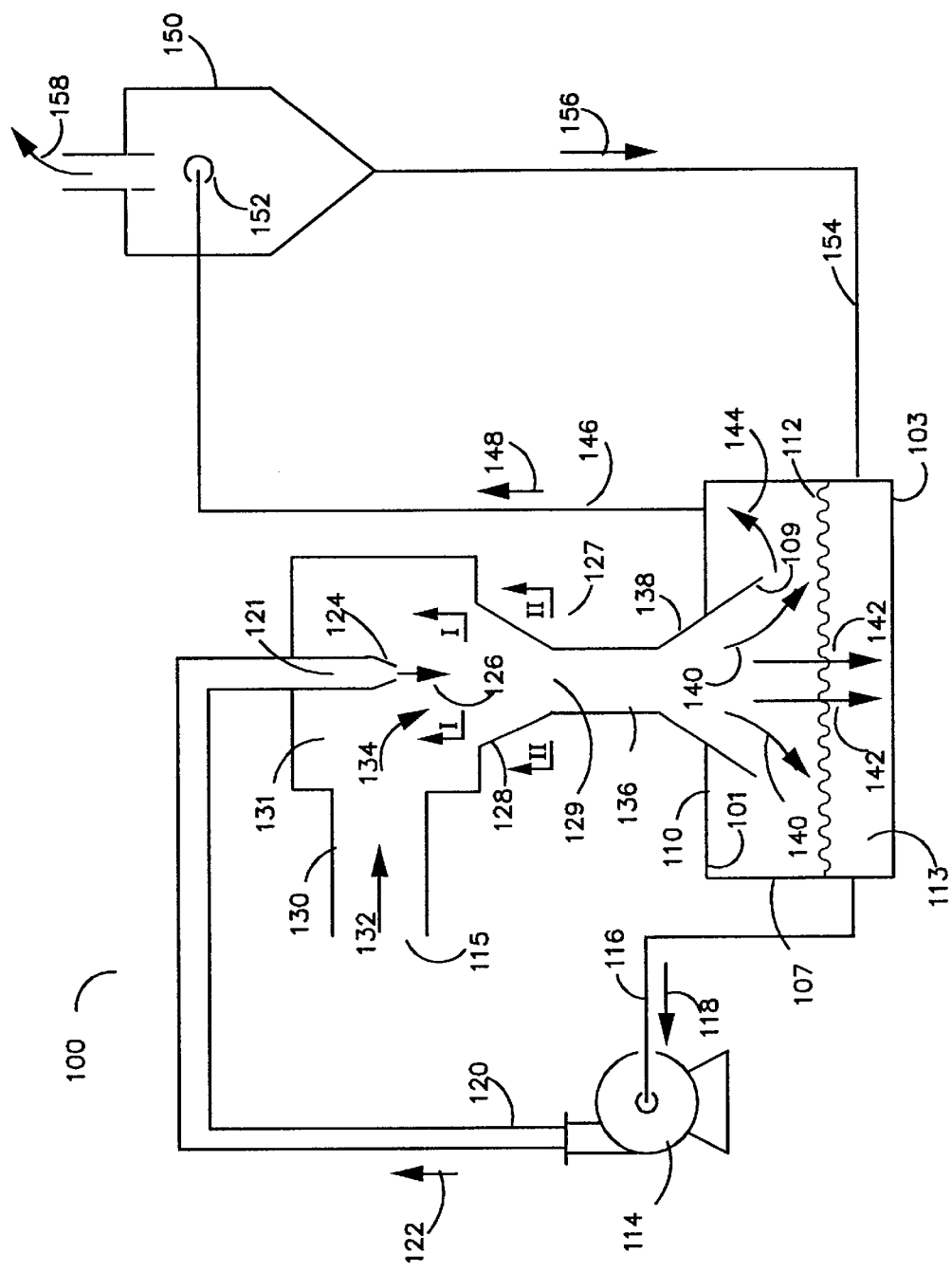
FIG. 1 is a schematic view of a gas scrubber of the present invention.

Refer now to the drawings wherein depicted elements are not necessarily shown to scale and wherein like or similar elements are designated by similar reference numerals through the several figures. For convenience similar elements in the various figures are denoted by similar numbers corresponding to the referenced figures.

FIG. 1 is a schematic view of a gas scrubber, generally denoted by the numeral 100. Scrubber 100 includes a container 110, a pump 114, a venturi scrubber denoted generally as 127 and a centrifugal separator 150. As shown, container 110 is connected to pump 114 via a pipe 116; pump 114 is connected to venturi scrubber 127 via a pipe 120; venturi scrubber 127 is functionally connected to container 110; container 110 is functionally connected to centrifugal separator 150 via line 146; and centrifugal separator 150 is connected to container 110 by a return line 154. For brevity, centrifugal separator 150 will be referred to as a "cyclone" hereinafter.

Container 110 contains a fluid 113 for absorbing undesired gases from a gas stream and for wetting particulates in a gas stream for removal. Fluid 113 may be water and/or other chemical combinations to remove odors, carbon dioxide, particulates, allergens, dust, bacteria and other undesirable elements and compounds. Chemicals, well known in the art, such as, but not limited to chlorine and copper sulfate and odor masking agents may be added to liquid 113 to aid in the absorption of undesired gases and/or to enhance the aroma of the emitted cleansed air stream. When fluid 113 is water and utilized to clean air an excessive amount of water may be absorbed by the air. Therefore, it may be desired to utilize a light oil as fluid 113 to reduce the retention of water in the emitted cleansed air stream. Many different solutions may be utilized for fluid 113 and are well known in the art. Fluid 113 may include propylene glycol. Propylene glycol is a substantially odorless and colorless compound that may be utilized as a disinfectant. Propylene glycol also suppresses the absorption of water by the gas being scrubbed. Thus reducing the humidity of the scrubbed gas and also lowering the consumption of fluid 113 used by the scrubbing device. The use of propylene glycol also aides in reducing the propagation of bacteria.

Container 110 includes a top wall 101 and bottom wall 103 connected by a sidewall 107. A sleeve or cylinder 127, which serves as a venturi, having an inlet-opening 128 and outlet-opening 109 extends through top wall 101. Opening 128 is positioned toward the exterior of container 110 for admittance of a gas 115. Outlet-opening 109 is positioned within container 110.

Sleeve 127, which serves as a venturi, includes an inlet opening 130 connected by throat 129 to an outlet opening 109, shown formed by an inverted funnel section 138. As is well known in the art, venturi 127 may be utilized as a gas scrubber by passing a pressurized fluid 121 through a nozzle 124 positioned within a suction chamber 131 forcing the motive fluid 126 through a funnel 128 and into a mixing chamber 136 and exiting through an outlet opening 109. As motive fluid 126 passes from nozzle 124 through suction chamber 131 into funnel 128 it draws a gas 115, such as air, into stream 126 as indicated by arrows 132 and 134. As shown in FIG. 1, gas 115 is drawn from the surrounding atmosphere through a conduit 130.

More specifically, in relation to FIG. 1, container 110 holds a liquid 113 that is drawn into pump 114 through pipe 116 as indicated by arrow 118. Pump 114 produces a pressurized liquid 121 that flows through pipe 120 to converging nozzle 124 as indicated by arrow 122. Pressurized fluid 121 is discharged through nozzle 124 which causes pressurized fluid 121 to accelerate as it passes through the converging nozzle 124 and exits nozzle 124 as motive fluid stream 126 as shown by the arrow. In a typical venturi scrubber 127, nozzle 124 is of the converging type if motive fluid 126 is a liquid, or of the expanding type if motive fluid 126 is steam or another gas.

Gas 115 from the surrounding atmosphere enters venturi scrubber 127 through conduit 130 and into suction chamber 131 as indicated by arrow 132. Within suction chamber 131 gas 115 is drawn into motive fluid stream 121. Since liquid pressurized fluid 121 is substantially non-compressible and non-expandable, it breaks up into many small droplets and the space between these droplets becomes occupied by gas 115 in chamber 131. Gas 115 disposed between motive fluid 121 droplets obtain substantially the same high velocity as motive fluid 126 and the friction between the periphery of the mixture of motive fluid 126 and gas 115 draws addition gas 15 with stream 126 into funnel 128. This process forms a low pressure zone in suction chamber 131 and draws additional atmospheric gas in through conduit 130.

Gas 115 is further mixed with the motive fluid 126 as it flows at a high velocity through the throat 129 of mixing chamber 136. As mixture 126 flows through inverted funnel 138 the kinetic energy is converted to pressure and discharged into container 110 impacting the surface 112 of fluid 113 Some of the mixture continues beneath surface 112 of liquid 113, as indicated by arrows 142, to further entrain and mix gas 115 with the liquid.

Funnel 128, mixing chamber 136, and inverted funnel 138 and motive fluid nozzle 124 form venturi scrubber 127. Funnel 128, having a restrictive throat 129, is the converging inlet to venturi scrubber 127. Mixing chamber 136 is the center restriction of venturi scrubber 127 and may be lengthened as desired to afford additional mixing of gas 115 and motive fluid 126. Inverted funnel 138 is an expanding diffuser of venturi scrubber 127 that reduces the velocity of stream 126 and converts the kinetic energy to pressure at discharge into container 110.

Inverted funnel section 138 is usually used in a standard venturi scrubber apparatus, and is shown in FIG. 1 only to show how it is sometimes used. However, it has been found that in actual practice, for some uses, the omission of inverted funnel section 138 allows the mixture of gas and liquid 126 to flow directly from mixing section 136 at a greater velocity and force, disposing at least a portion of stream 126 beneath surface 112 of fluid 113. This greater force of the mixed stream 126 hitting surface 112 of fluid 113 and submerging the mixture improves the removal of smaller particulates from the original gas stream 115. Also, mixing section 136 may be shortened or completely omitted on some designs since some mixing of gas 115 and fluid 126 takes place at as stream 126 enters funnel 128 and flows through the outlet throat 129 of funnel 128. The outlet throat 129 of funnel 128 actually acts as a check valve since the restriction is sized to be only slightly larger than mixture stream 126 and the high velocity of stream 126 allows flow in only one direction. Accordingly, the down stream pressure of funnel 128 in container 110 is greater than the up stream pressure in suction chamber 131.

Gas 115 separates by gravity and impact from the stream 126 and fluid 113 in container 110. Due to the higher pressure in container 110, as explained above, partially cleansed gas 115 flows out of container 110 as indicated by arrow 144. The released gas 115 flows through pipe 146, as indicated by arrow 148, and to cyclone 150 through tangential nozzle 152. Cyclone 150 is a simple mechanical device for centrifugal separating particulates and free liquid mist and droplets from gas, well known in the art. These droplets coalesce on the inside wall of cyclone 150 and gravitate through pipe 154 to container 110 as indicated by arrow 156. The processed gas 115 flows out cyclone 150 as indicated by arrow 158.

Figure 1A:
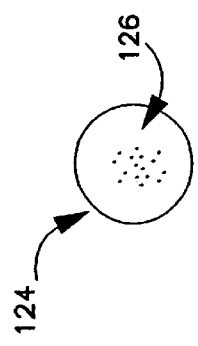
FIG. 1A is a view of nozzle 124 and the exiting motive fluid stream along section line I—I of FIG. 1.
Figure 1B:
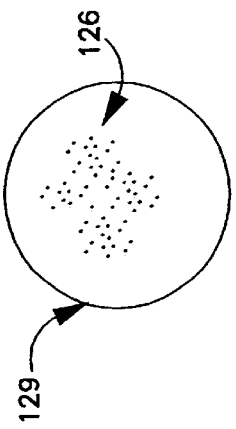
FIG. 1B is a view of throat 129 of funnel 128 as shown along section line II—II of FIG. 1.

FIG. 1A is a view of nozzle 124 and the exiting motive fluid stream 126 along section line I—I of FIG. 1. Nozzle 124 forms a round outlet that produces an accelerated round jet stream of motive fluid 126. FIG. 1B is a view of throat 129 of funnel 128 as shown along section line II—II of FIG. 1. Throat 129 is a substantially circular opening that is larger in diameter than the outlet of nozzle 124.

Figure 2A:
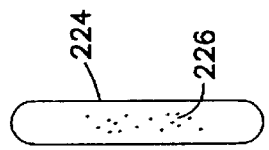
FIG. 2A is a view of nozzle 224 shown along the section line III—III of FIG. 2.
Figure 2B:
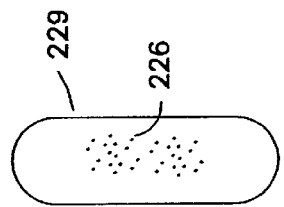
FIG. 2B is a view of throat 229 formed by funnel 228 along the section line IV—IV of FIG. 2.
Figure 2:
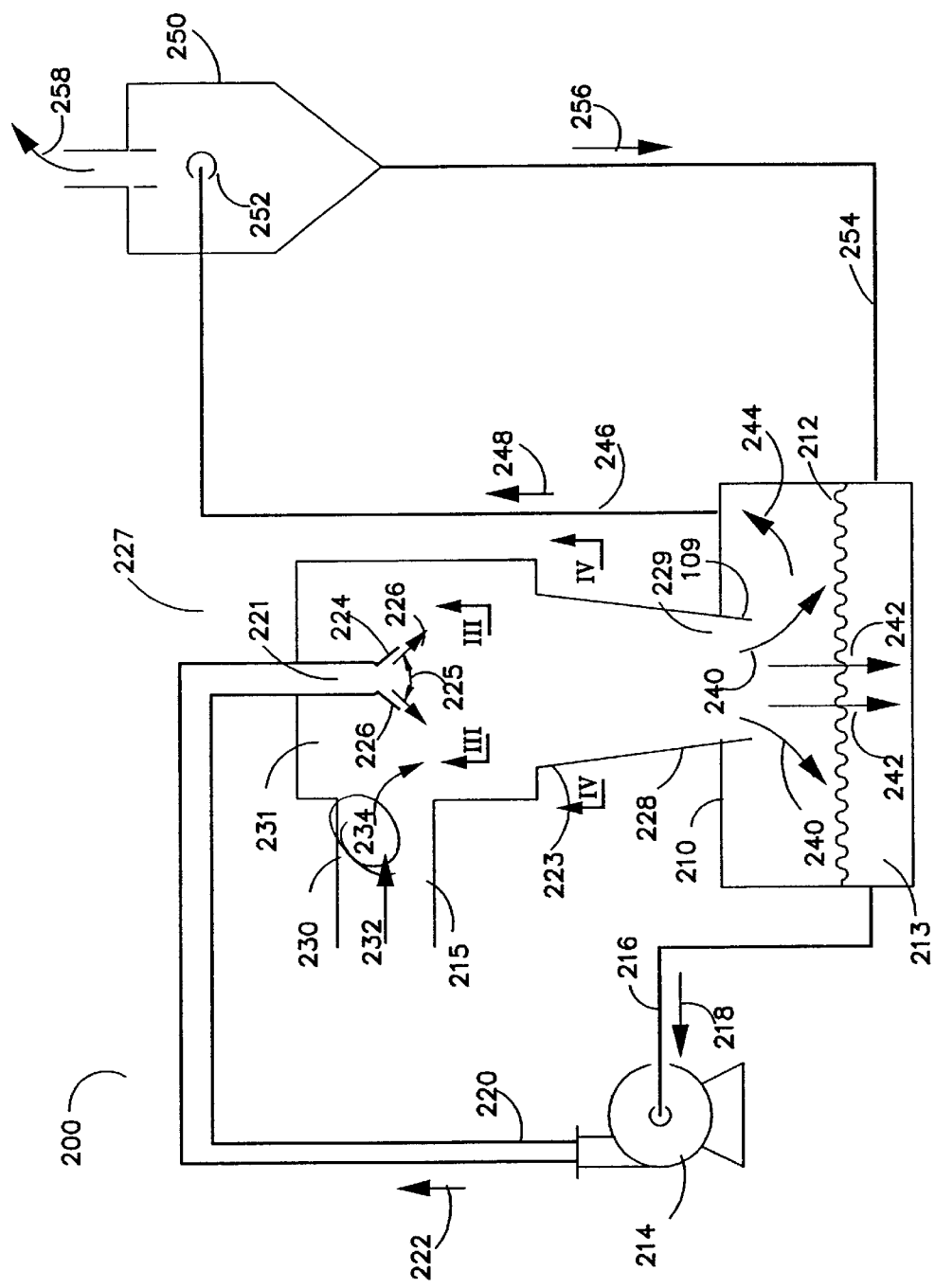
FIG. 2 is a schematic view of an embodiment of the gas scrubber of the present invention.

FIG. 2 is a schematic view of a gas scrubber, generally denoted by the numeral 200, of the present invention. Container 210 holds liquid 213 that is pumped by pump 214 through pipe 216 as indicated by arrow 218. The pump creates a pressurized liquid 221 that flows through pipe 220 to oblong shaped nozzle 224 as indicated by arrow 222. The pressurized fluid 221 flows through converging oblong shaped nozzle 224 which causes the motive fluid 226 to accelerate as it passes through the oblong shaped converging portion of nozzle 224 and exits the nozzle in a high velocity thin fan shaped stream, as shown by arrows 226.

Gas 215 enters the sleeve 227, shown as a venturi scrubber, through conduit 230 as indicated by arrows 232 and 234. The suction chamber 231 is where the pumping takes place. As the accelerated motive fluid 226 leaves nozzle 224, as indicated by the arrow, the friction between it and the suction gas 215 in suction chamber 231 forces mixture 226 into the oblong shaped funnel section 228 and through throat 229, lowering the pressure in chamber 231 and drawing more gas 215 through conduit 230 and through inlet-opening 223 defined by funnel section 228 into throat 229. This arrangement creates a draft that accelerates the removal of gas 215 through conduit 230 in accordance with arrow 232. The motive fluid 226 entrains gas 215 and uniformly mixes the combined stream in funnel section 228 and throat 229, as indicated by arrows 240. Some of the mixture continues on beneath the surface 212 of liquid 213, as indicated by arrows 242, to further entrain and mix gas 215 with the liquid 213.

Gases 215 separate from the liquid in container 210 and flow out of the container as indicated by arrow 244. The gas flows through pipe 246, as indicated by arrow 248, to cyclone 250 through tangential nozzle 252. Cyclone 250 is a simple cyclone and centrifugally separates free liquid mist and droplets and particulates contained in the mist and droplets, from the gas. These droplets coalesce on the inside wall of the cyclone and gravitate through pipe 254 to container 210 as indicated by arrow 256. The processed gas 215 flows out cyclone 250 as indicated by arrow 258.

FIG. 2A is a view of nozzle 224 shown along the section line III—III of FIG. 2. Nozzle 224 forms an oblong outlet that produces a flat fan or oblong shaped stream, as shown by angle 225, of motive fluid 226 that is discharged.

FIG. 2B is a view of throat 229 formed by sleeve 227 along the section line IV—IV of FIG. 2. Throat 229 is formed in an oblong fashion having dimensions larger than the oblong shape of nozzle 224. Throat 29 receives the mixture of motive fluid 226 and gas 215.

It has been found that pump 114 (FIG. 1) is unusually expensive and noisy, especially for home use. This excess expense and noise is due to the low volume of liquid 113 required to yield high-pressure fluid 121. It has been found that changing nozzle 114, having a round nozzle, to a converging oblong nozzle 214 (FIG. 2) forming a flat fan or oblong shaped motive fluid stream 226 requires a lower pressure, pressurized fluid 221. This lower pressure requirement of fluid 221 over fluid 121 allows for the downsizing of pump 114 to pump 214 thereby reducing costs and often reducing noise levels.

The peripheral surface of the flat oblong motive fluid stream 226 of FIGS. 2 and 2A is greater than the periphery surface of the round motive fluid stream 126 of FIGS. 1 and 1A, with both streams utilizing approximately the same quantity of liquid 113 or 213. Because oblong motive stream 226 contacts more gas 215 for the same quantity of liquid 213 as round motive stream 126 a lower pressure is required for pressurized fluid 221 of pressurized fluid 121. This lower pressure requirement allows for the reduction of pumping requirements of pump 214 over that of pump 114.

The angle 225 of flat fan (oblong) shaped stream 226 can be any desired angle. In fact, it can be a complete circle making a 360 degree flat stream shown as 326 in FIG. 3. These various shaped streams can be obtained easily by experimenting with the nozzles. Nozzles can be purchased from manufacturers who specialize in making various sizes and shapes of nozzles that produce various types of streams, including thin fan shaped, flat streams, and flat hollow cone streams. One such manufacture is Bette Fog Nozzle, Inc, currently located at PO Box 1438, 50 Greenfield Street, Greenfield, Mass., 01302-1428.

Figure 3:
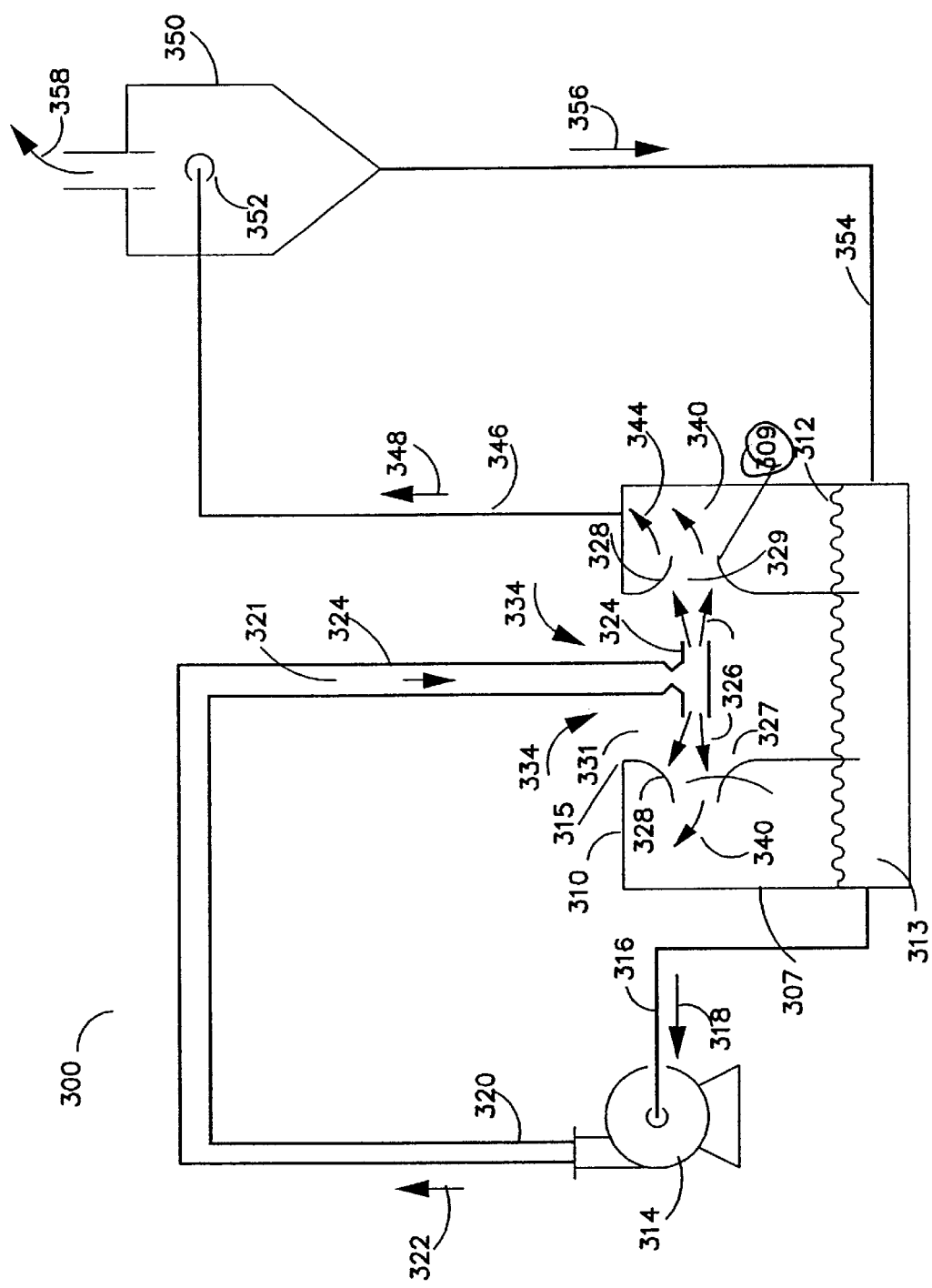
FIG. 3 is a schematic view of an embodiment of the gas scrubber of the present invention.

FIG. 3 is a schematic view of a gas scrubber, generally denoted by the numeral 300, of the present invention. Scrubber 300 is substantially the same as scrubber 200 of FIG. 2 except that nozzle 324 produces a flat 360-degree stream of high velocity liquid 326.

In operating scrubber 300, high pressure liquid 321 is formed by nozzle 324 to a high velocity 360 degree full circle motive stream of thin liquid 326. Gas 315 enters gas scrubber 300 through suction chamber 331 as indicated by arrows 334. The entrance chamber 331 is where the pumping takes place. As the accelerated motive fluid stream 326 leaves nozzle 324, as indicated by the arrows, stream 326 expands and breaks up into many small droplets and the space between these droplets becomes occupied by gas 315 in chamber 331. The friction between the periphery of this mixture of accelerated liquid and gas of stream 326 and gas 315 in entrance 330 carries additional gas 315 with stream 326 and forces the mixture into inlet-opening formed by funnel 328 and through throat 329 lowering the pressure in entrance 331 and drawing in more gas 315. This arrangement creates a draft that accelerates the removal of gas 315 from entrance 330. Funnel section 328 is a full circle converging section, having full circle throat 329, that concentrates and directs the full circle mixture 326 from entrance 331 to the inside of chamber 310 and against a wall 307 of container 310. Motive fluid 326 entrains gas 315 and uniformly mixes the combined stream in the funnel 328 and throat 329 of sleeve 327. In other regards, scrubber 300 operates the same as scrubber 100 and 200 of FIGS. 1 and 2. Pump 314 pumps liquid 313 having surface 312, through suction pipe 316, as shown by arrow 318, through discharge pipe 320 and 324, as shown by arrow 322, to nozzle 324. Gas flows out of container 310, as shown by arrows 340 and 344, through pipe 346, as shown by arrow 348, and to cyclone 350 through tangential nozzle 352. Droplets from the gas coalesce on the inside wall of cyclone 350 and gravitate through pipe 354 to container 310 as shown by arrow 356. The processed gas flows out of cyclone 350 as shown by arrow 358.

Figure 4:
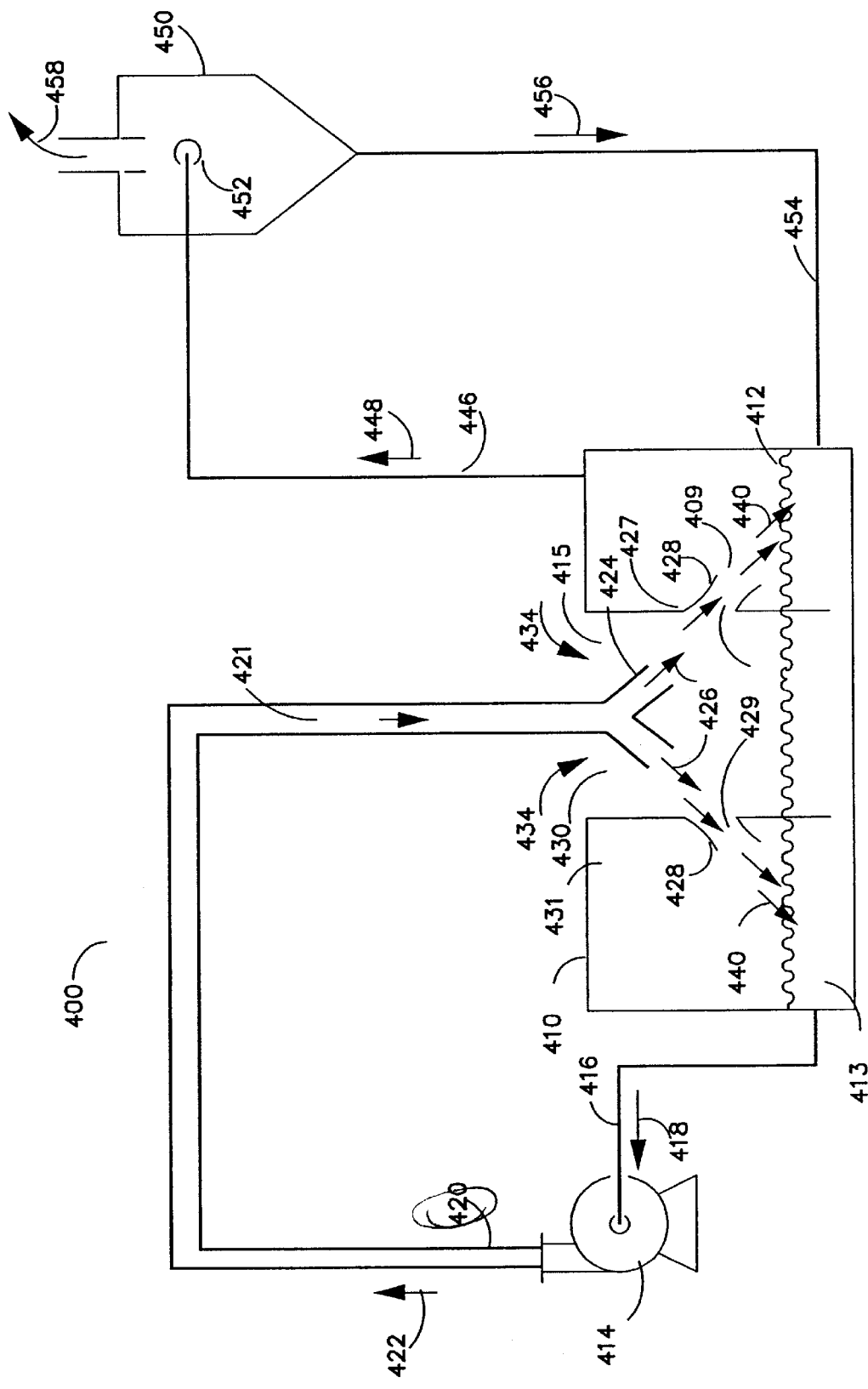
FIG. 4 is a schematic view of another embodiment of the gas scrubber of the present invention.

FIG. 4 is a schematic view of another embodiment of the gas scrubber of the present invention generally denoted by the numeral 400. FIG. 4 shows a scrubber 400 having a nozzle 424 that produces a 360 degree hollow cone shaped, thin stream of high velocity liquid 426. Gas 415 is pulled from the outside of container 410 through inlet opening 430 to the inside 431 of container 410 as shown by arrows 434.

One advantage of the hollow cone shaped stream 426 is that motive stream 426 is directed downward as it pulls gas 415 through full circle inlet-opening 428, and full circle throat 429, having opening 409, of sleeve 427, and the mixture of gas 415 and in stream 426 impacts surface 412 of liquid 413, as indicated by arrow 440, submerging mixture 426 beneath surface 412. This feature is also very important since mixture 426 hitting surface 412 of liquid 413 is considerably quieter than the mixture hitting sidewall 307 of container 310, as shown in FIG. 3. Pump 414 pumps liquid 413, having surface 412, through suction pipe 416, as shown by arrow 418, through discharge pipe 420, as shown by arrow 422, to produce pressurized stream 421 that flows to nozzle 424. Gas flows out of container 410 through pipe 446, as shown by arrow 448, and to cyclone 450 through tangential nozzle 452. Droplets from the gas coalesce on the inside wall of cyclone 450 and gravitate through pipe 454 to container 410 as shown by arrow 456. The processed gas flows out of cyclone 450 as shown by arrow 458.

Figure 5:
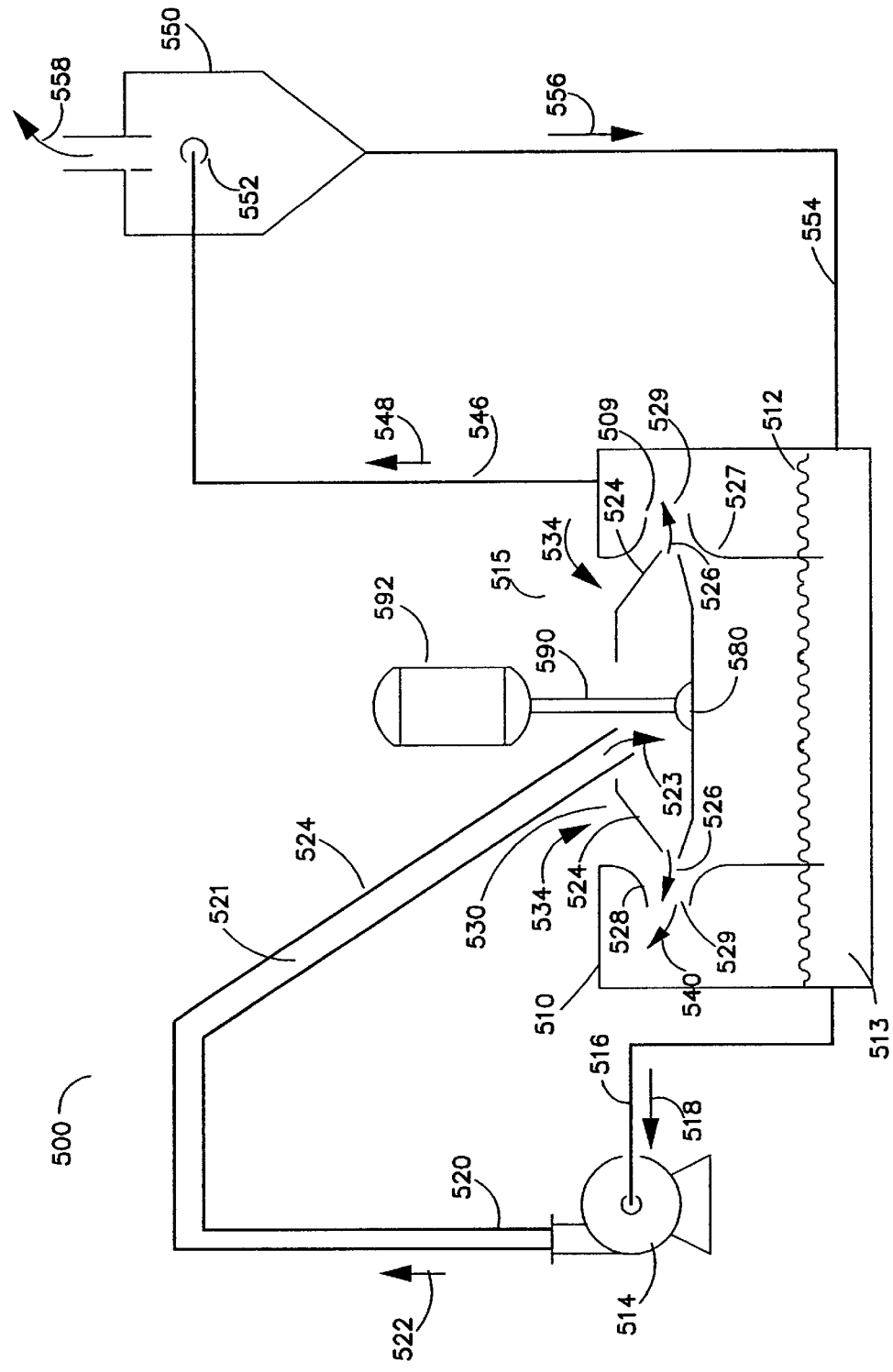
FIG. 5 is a schematic view of another embodiment of the gas scrubber of the present invention.

FIG. 5 is a schematic view of another embodiment of the gas scrubber of the present invention generally denoted by the numeral 500. Gas scrubber 500 further includes a disk 580 rotatable connected to a motor 592 via shaft 590. Rotatable disk 580 reduces the requirements of pump 514, while producing the necessary motive stream 526 for scrubbing, thereby reducing the cost of the apparatus and the noise in comparison to some other embodiments of the present invention. Pump 514 pumps liquid 513, having surface 512, through suction pipe 516, as shown by arrow 518, through discharge pipe 520 and 524, as shown by arrow 522, to disk 580, as shown by arrow 523. Gas 515 is pulled to the inside of container 510 through opening 530 by fluid stream 526 as shown by arrows 534. Gas flows out of container 510 through pipe 546, as shown by arrow 548, and to cyclone 550 through tangential nozzle 552. Droplets from the gas coalesce on the inside wall of cyclone 550 and gravitate through pipe 554 to container 510 as shown by arrow 556. The processed gas flows out of cyclone 550 as shown by 558.

Pressurized stream 521 may be of a lower pressure stream delivered by pump 514 than the pressurized streams of the previous embodiments. Steam 521 is delivered through conduit 520 to rotating circular disk 580 as shown by arrow 523. When stream 521 contacts rotating disk 580 it is propelled outward and forced through converging nozzle 524 (similar to nozzle 324 of FIG. 3) which produces a high velocity, full circle, thin stream of motive fluid 526. Motive fluid stream 526 mixes with gas 515 and pulls the mixture through converging funnel inlet-opening 528 and throat 529 of sleeve 527 as described in regard to the similar elements of FIG. 3.

Scrubber 500 may utilize a lower pressure, smaller, quieter and less expensive pump 514 than some of the other described pumps to produce motive stream 526 due to disk 580. Disk 580 and motor 592 are typically a less precise and less expensive way to produce high velocity, motive stream 526.

Figure 6:
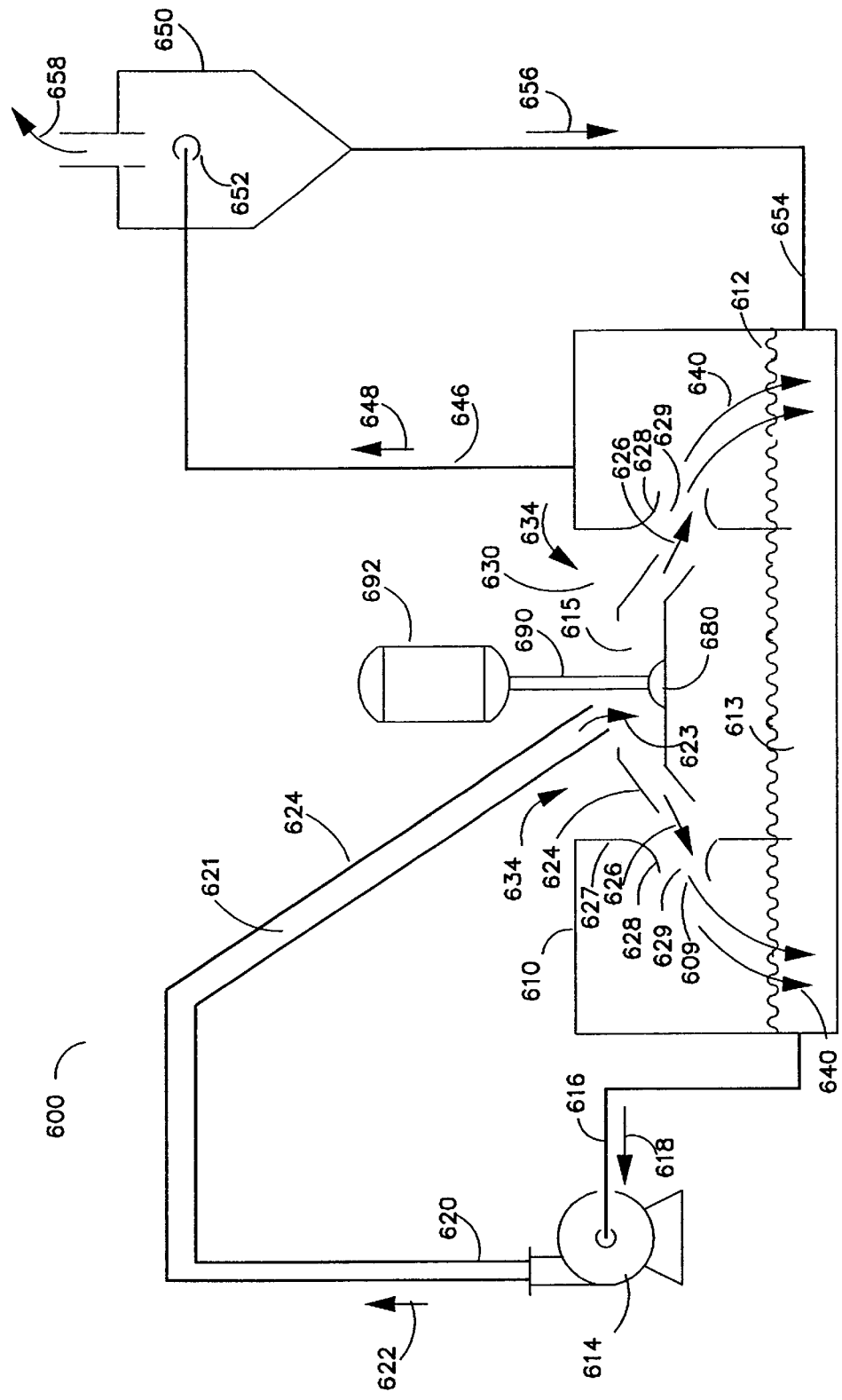
FIG. 6 is a schematic view of another embodiment of the gas scrubber of the present invention.

FIG. 6 is a schematic view of another embodiment of the gas scrubber of the present invention generally denoted by the numeral 600.

Gas scrubber 600 is substantially the same as scrubber 500 (FIG. 5) utilizing a nozzle 624 is directed downward in a similar manner as hollow cone nozzle 424 described in relation to FIG. 4.

Nozzle 624 produces the mixed stream 626 that hits the surface 612 of liquid 613 with stream 626 as shown by arrow 640, and submerges the mixture, as shown. Scrubber 600 may be preferred over scrubber 500 because it is quieter. Operation of scrubber 600 is described in relation to the scrubbers of FIGS. 4 and 5. Pump 614 pumps liquid 613, having surface 612, through suction pipe 616, as shown by arrow 618, through discharge pipe 620 and 624 as liquid 621, as shown by arrow 622, to disk 680, as shown by arrow 623. Rotatable disk 680 is rotated by shaft 690 by motor 692. When stream 621 contacts rotating disk 680 it is propelled outward and forced through converging nozzle 624 which produces a high velocity, full circle, thin stream of motive fluid 626 which mixes with gas 615 and becomes a high velocity mixed stream 626 of fluid 621 and gas 615. Motive fluid stream 626 and mixed stream 626 are the same stream and it pulls the mixture through converging funnel inlet opening 628 and through 629 of sleeve 627. Nozzle 624 is directed downward, as shown, so that the steam 626 hits surface 612 as shown by arrows 640. Gas 615 is pulled to the inside of container 610 through pipe 646, as shown by arrow 648, and to cyclone 650 through tangential nozzle 652. Droplets from the gas coalesce on the inside wall of cyclone 650 and gravitate through pipe 654 to container 610 as shown by arrow 656. The processed gas flows out of cyclone 650 as shown by arrow 658.

Figure 6A:
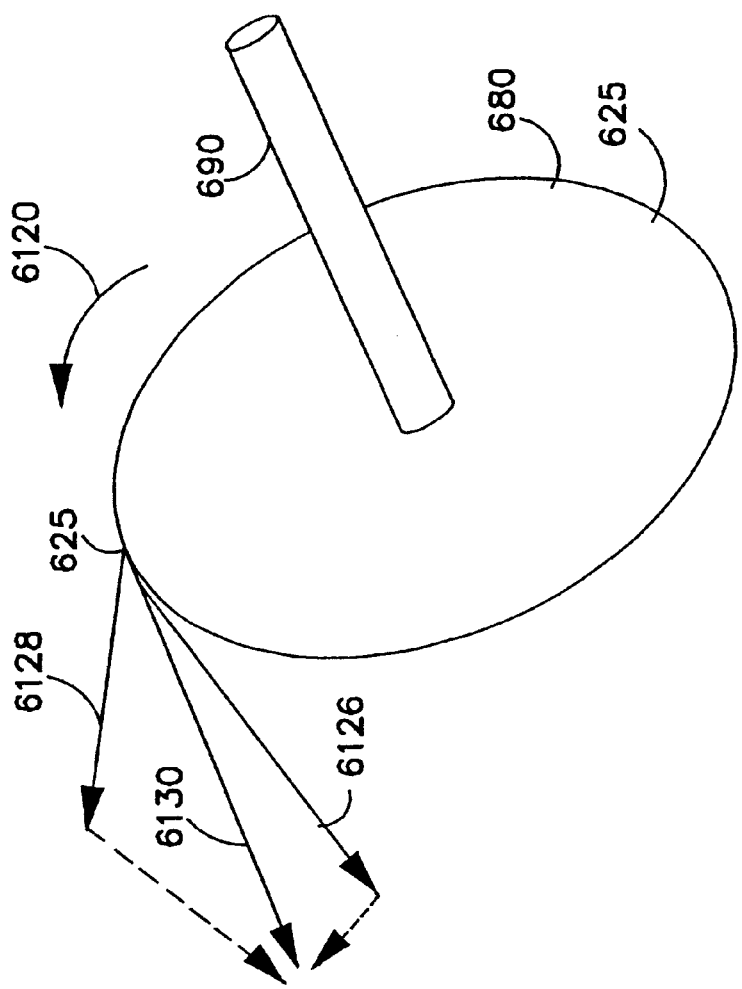
FIG. 6A is an isolated, perspective view of the disk as shown in relation to its operation in relation to FIG. 6.

FIG. 6A is an isolated, perspective view of disk 680 shown and described in relation to its operation depicted in FIG. 6. Disk 680 is rotating as shown by the arrow 6120 by shaft 690. As fluid stream 626 in FIG. 6 is discharged from disk 680 at point 625 it moves with a force and in a direction that is 90 degrees to the direction of rotation as shown by force arrow 6126. Since nozzle 624 of FIG. 6 is directed downward at location 625 shown in FIG. 6A, the liquid moves with a force and in a direction as shown by force arrow 6128. Forces 6126 and 6128 produce a resultant force as shown by arrow 6130 (stream 626 in FIG. 6), which is down and in the direction of rotation of disk 680.

Figure 7:
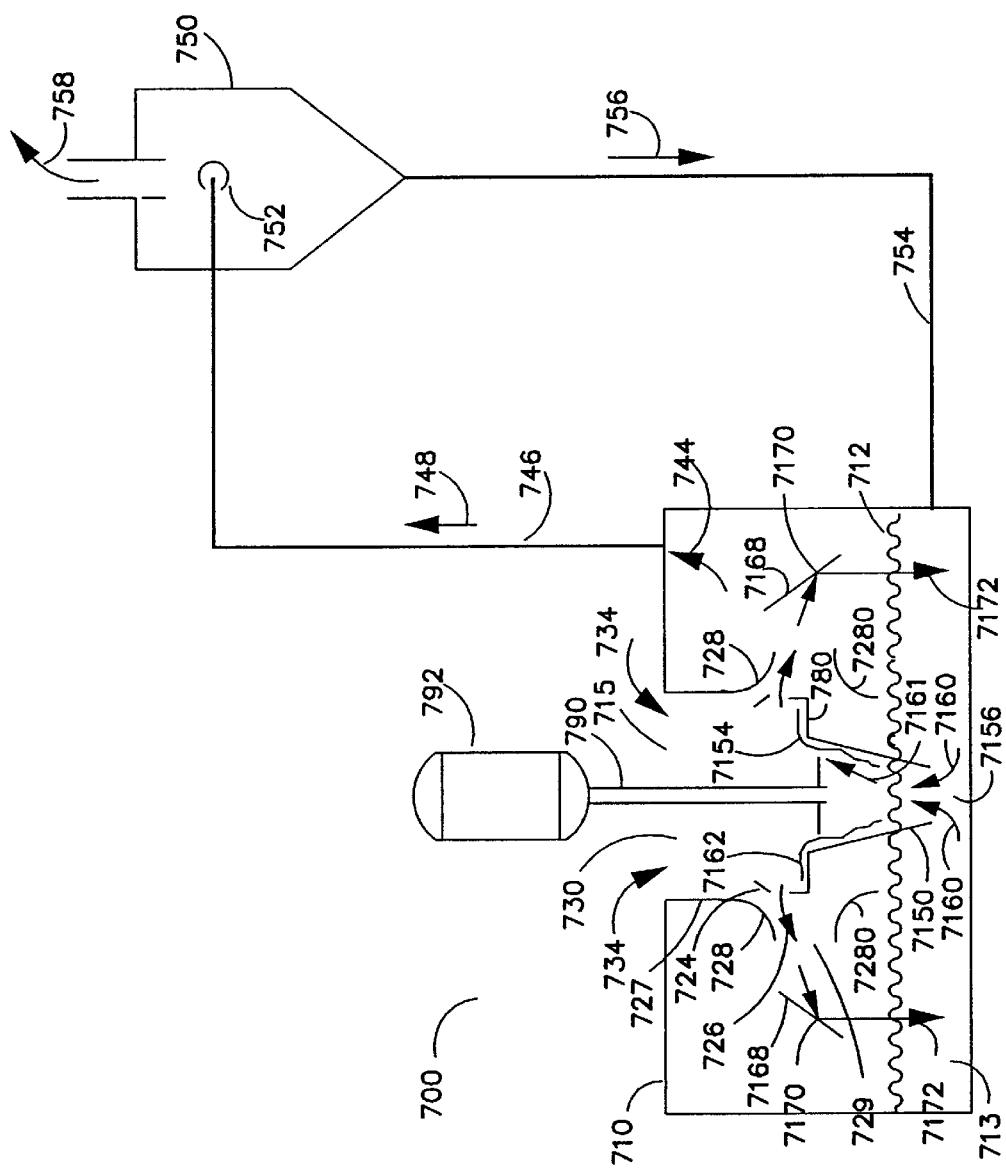
FIG. 7 is a schematic view of another embodiment of a gas scrubber of the present invention replacing the pump of the previous embodiments.

FIG. 7 is a schematic view of another embodiment of a gas scrubber of the present invention generally denoted by the numeral 700. Scrubber 700 eliminates the pump as described in the previous embodiments and replaces the pump with a siphon pipe 7150 and disk 780 connected to motor 792 via shaft 790.

Siphon pipe 7150 is rotatably connected to disk 780 and nozzle 724. Siphon pipe 7150 is cone shaped having an inlet opening 7156 disposed below surface 712 of liquid 713. Pipe 7150 also has an outlet opening 7154 located proximate disk 780. Outlet opening 7154 is larger than inlet opening 7156 as indicated by the cone shape of siphon pipe 7150.

Since inlet opening 7156 is submerged in liquid 713, liquid 713 flows inside and up siphon pipe 7150 as indicated by arrows 7160, as pipe 7150 rotates. The rate of flow of liquid 713 can be selected since the flow rate is dependant on the size of opening 7156 and the amount of liquid head produced by the depth that inlet opening 7156 is submerged. Since pipe 7150 is rotating, the liquid inside of cylinder 7150 rotates with the cylinder and is centrifugally forced outward and up the cylinder, as indicated by arrows 7161, and since the rim of outlet opening 7154 is further out than the rim of inlet opening 7156, the liquid flows on to disk 780, as indicated by liquid 7162.

As seen from above, siphon pipe 7150 serves as a simple and economical pump. An easy, simple, and economical way to transfer, and return, a selected amount of liquid 713 from beneath disk 780 up and to disk 780. Since siphon pipe 7150 is really a pump, impellers, disks, or partitions may be added to the inside of pipe 7150, if desired, to aid in the rotation of the liquid. However, these are not shown in the drawings since they are not needed in most cases.

In operating the apparatus of FIG. 7, container 710, having an opening 730 and a full circle funnel opening 728, with full circle throat 729, that encircles rotating disk 780, contains a liquid 713. Rotation of disk 780 and pipe 7150 draws liquid 7162 from liquid 713 onto disk 780 and imparts a high velocity to liquid 7162. Liquid 7162 flows out of converging circular outlet 728 in a high velocity thin circular stream of liquid 726 that flows through circular funnel 728 and throat 729 attached to sleeve 727, as indicated by arrows 726. Since cylinder 7150 rotates with disk 780, the liquid inside of pipe 7150 is forced outward centrifugally and up and out opening 7154, as indicated by arrow 7161, to replace the liquid 7162 on disk 780.

When high velocity liquid stream 726 flows through circular funnel 728 and throat 729, it pulls gas 715 through opening 730, as shown by arrow 734, and through throat 729, as indicated by arrows 726, and to the inside of container 710. Gases 715 separate from the liquid in container 710 and flow out of the container as indicated by arrow 744. The gas flows through pipe 746, as indicated by arrow 748, and to cyclone 750 through tangential nozzle 752. Cyclone 750 is a simple cyclone, well known by those familiar with the art, and centrifugally separates free liquid mist and droplets from the gas. These droplets coalesce on the inside of the cyclone and gravitate through pipe 754 to container 710 as indicated by arrow 756. The processed gas 715 flows out cyclone 750 as indicated by arrow 758.

The bottom circular section 7280 of funnel 728 may be omitted, if desired, since the liquid 726 flows close enough to the top portion of funnel 728 to draw gas 715 into container 710. If the bottom circular section 7280 of funnel 728 is omitted, then, the top section of funnel 728 serves as throat 729 and forms a partition that forms a restricted area between the wall of the top section of funnel 728 and surface 712 of the liquid which prevents a backflow through said restricted area due to the high velocity of stream 726.

A circular plate 7168 may be added, if desired, to deflect the liquid and gas mixture 726 at point 7170 down and beneath the surface of liquid 713, as indicated by arrows 7172. Circular plate 7168 sometimes results in a quieter operation of scrubber 700.

Figure 8:
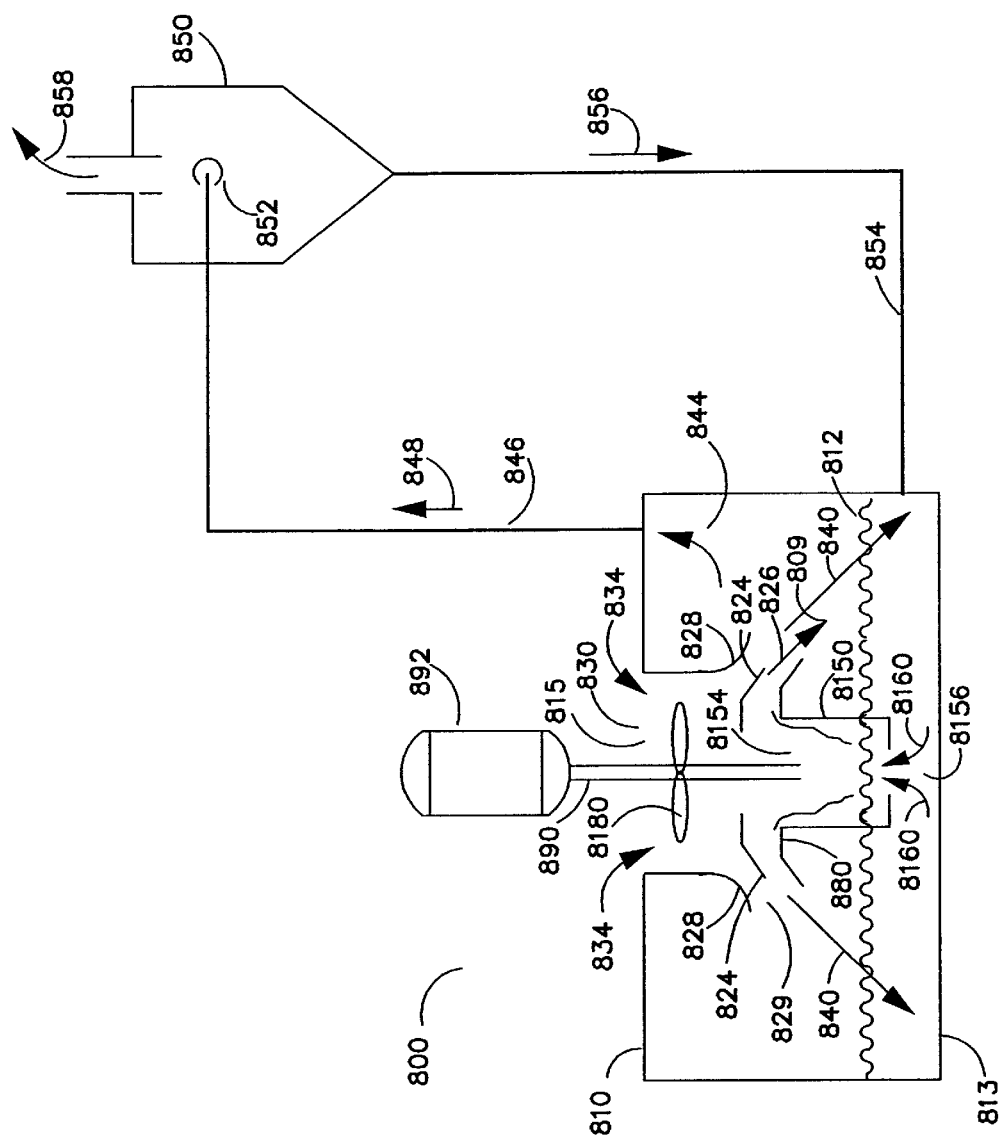
FIG. 8 is a schematic view of another embodiment of the gas scrubber of the present invention.

FIG. 8 is a schematic view of another embodiment of the gas scrubber of the present invention generally denoted by the numeral 800. Scrubber 800 includes a nozzle 824 angled downward to direct the flow of motive fluid stream 826 below surface 812 of fluid 813 as indicated by arrow 840. Gas flows out of container 810 through pipe 846, as shown by arrow 848, and to cyclone 850 through tangential nozzle 852. Droplets from the gas coalesce on the inside wall of cyclone 850 and gravitate through pipe 854 to container 810 as shown by arrow 856. The processed gas flows out of cyclone 850 as shown by arrow 858.

Scrubber 800 also differs from scrubber 700 of FIG. 7 in that cone shaped siphon pipe 7150 is replaced with a substantially cylindrical siphon pipe 8150. This illustrates that the siphon pipe can be formed in various shapes and sizes and will operate as long as inlet opening 8156 allows fluid 813 to flow inside of siphon pipe 8150, as shown by arrows 8160, and is smaller than outlet opening 8154 and positioned proximate the central axis of siphon pipe 8150.

Scrubber 800 further includes a propeller 8180 rotatably connected to shaft 890. Optional propeller 8180 pushes additional gas 815 through opening 830 of container 810, as shown by arrows 834 and, accordingly, mixes a greater quantity of gas 815 with the motive fluid stream 826. A regular fan shaped propeller 880 is shown in FIG. 8. However, any type of fan may be used. such as squirrel cage fan blades attached to nozzle 824, not shown, associated with funnel 828.

Scrubber 800 further includes a propeller 8180 rotatably connected to shaft 890. Optional propeller 8180 pushes additional gas 815 through opening 830 and, accordingly, mixes a greater quantity of gas 815 with the motive fluid stream 826. A regular fan shaped propeller 880 is shown in FIG. 8. However, any type of fan may be used, such as squirrel cage fan blades attached to nozzle 824, not shown, associated with funnel 828.

It is sometimes desirable to increase the quantity of gas flow through the scrubber of the present invention, relative to the rate of liquid flow, so propeller 8180 may selectively be added to any of the apparatus shown having a rotating disk with a shaft and motor.

Stream 826 of FIG. 8 is a solid thin high velocity 360 degree stream of driving fluid that flows under the top section of funnel 828 and through throat 829. The bottom section of funnel 828 is not shown, since it has been found that it may sometimes be omitted. It has been found that it is not necessary for stream 826 to be a solid undivided stream. In fact, it has been found that it is may be beneficial to have the 360 degree stream to consist of multiple small individual steams that are very close together, but yet separate. These multiple small individual streams are shown in FIG. 9.

Figure 9:
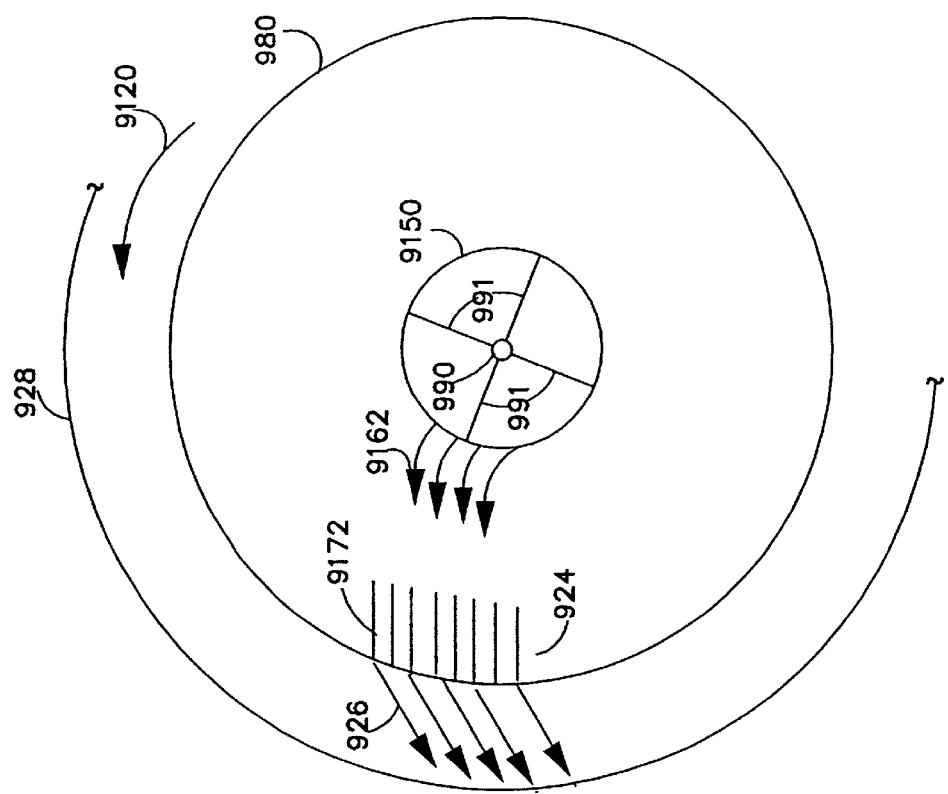
FIG. 9 is a top view of a modified disk.

FIG. 9 is a top view of a modified disk such as disk 880 of FIG. 8. Disk 980, of FIG. 9 is rotating in the direction indicated by arrow 9120 and is attached to pump cylinder 9150 and to shaft 990 by spokes 991, as shown. Disk 980 is associated with the top section of funnel 928, having throat 929 not shown. For clarity, only a partial circle of funnel 928 is shown.

Outlet rim 924 of disk 980 is provided with individual channels 9172 that are directed outward and downward from rotating disk 980. This separates stream 9162 into individual stream 926 that are directed downward and in the direction of rotation, as shown. For clarity, the rim of disk 980 is only shown with a few channels 9172 and streams 926. The rim may be completely filled with channels 9172 that nearly touch each other and individual streams 926 completely encircle disk 980.

The individual streams 926 are sufficiently close to each other that gas that is associated with the high velocity streams 926, and mixed between the streams, becomes mixed with the liquid and the mixture is carried out beneath the top section of funnel 928, and through throat 929 not shown, to the receiving chamber.

It has been found that channels 9172 of FIG. 9 can be formed in many different ways that shape the resultant stream of combined streams 9172. For example, streams 926, that completely encircles disk 980, can be separated in groups as shown in FIG. 10.

Figure 10:
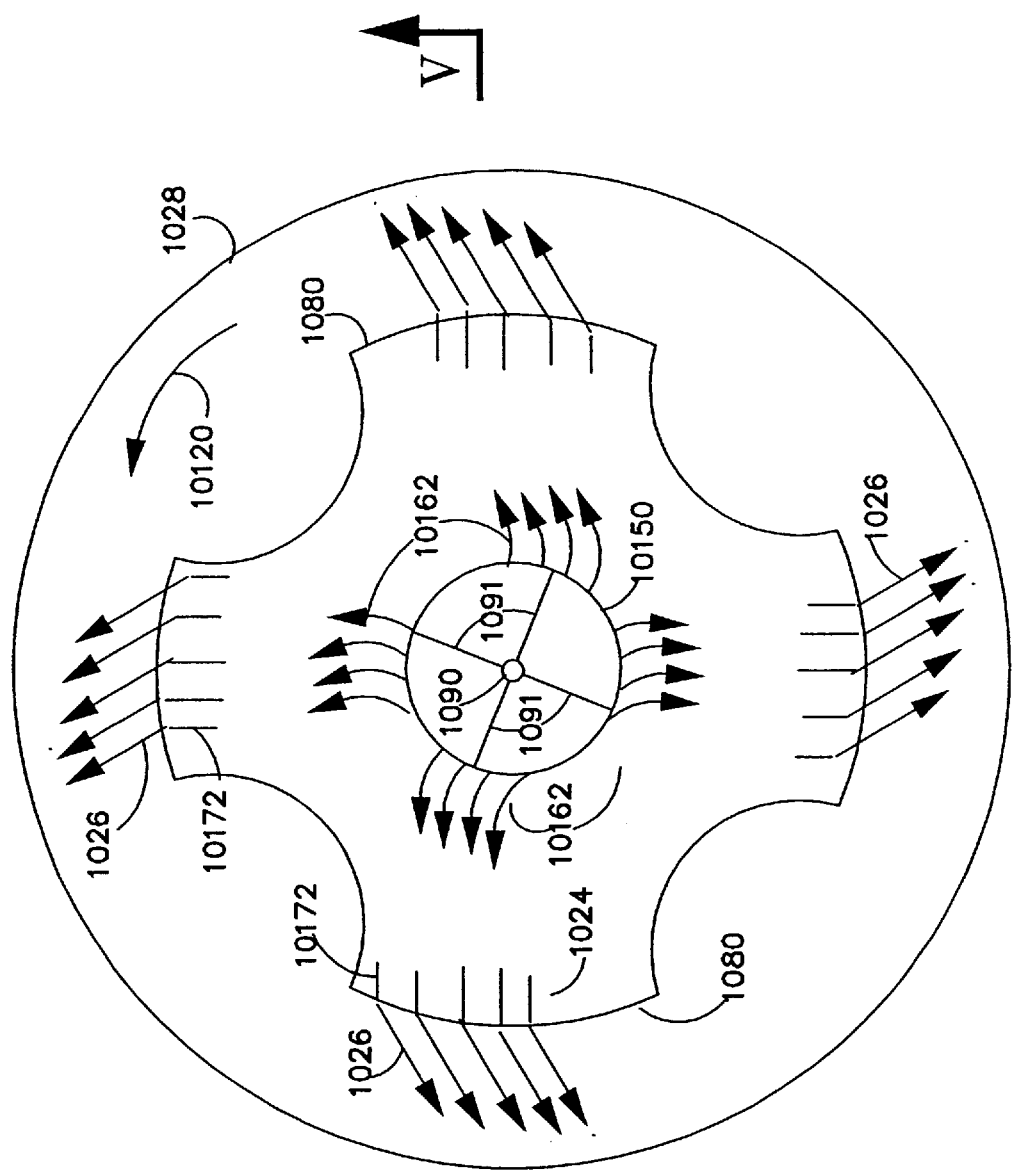
FIG. 10 is view of another embodiment of the disk of the present invention.
Figure 11:
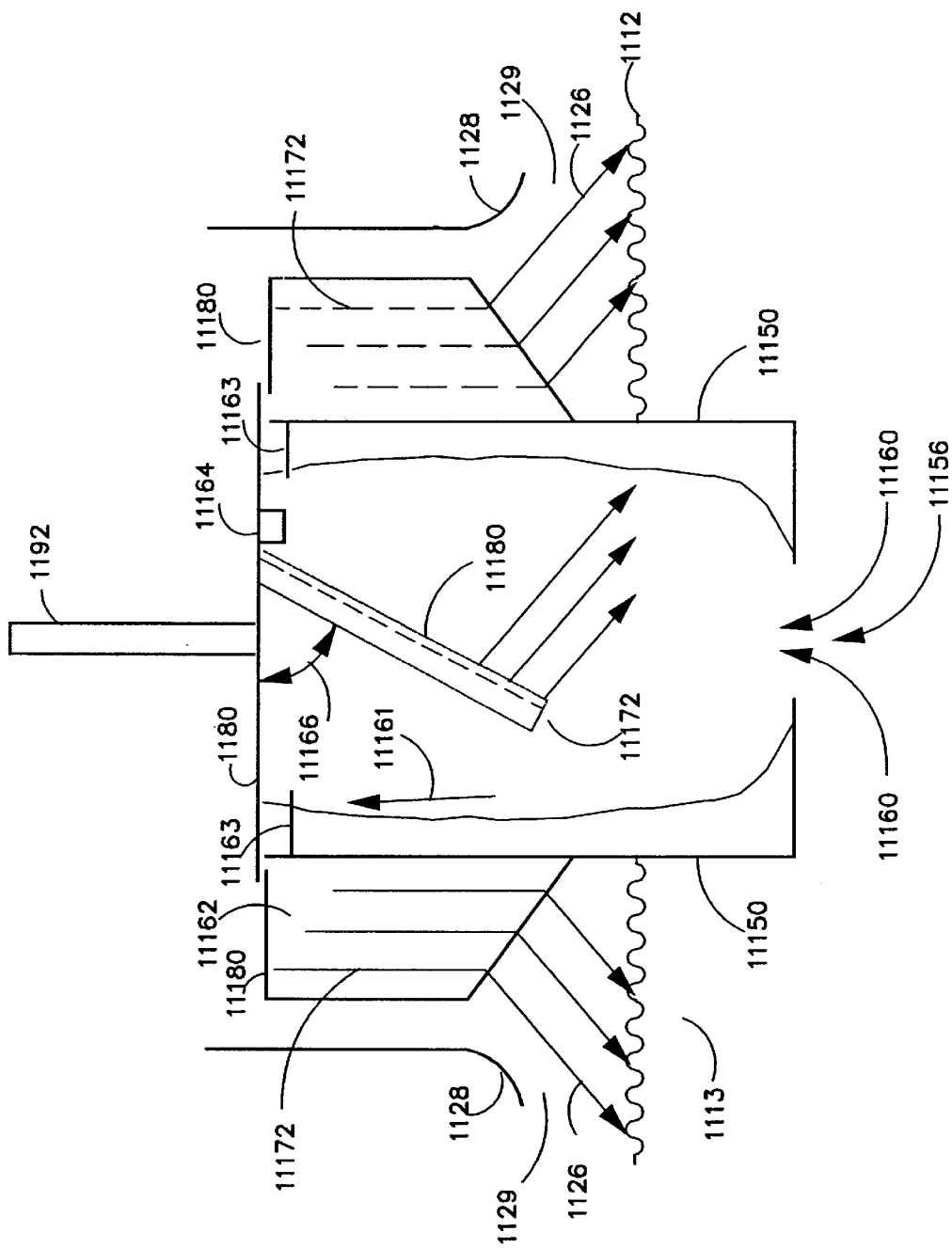
FIG. 11 is a side view of along the section line V—V of FIG. 10.

FIG. 10 is view of another embodiment of the disk of the present invention. Disk 1080, which is attached to shaft 1090 by spokes 1091 and siphon pipe 10150, is rotated in accordance with arrow 10120. Liquid stream 10162 flows to channels 10172 on rim 1024 of disk 1080. The rim of disk 1080 is provided with four groups of channels 10172 as shown. However, more groups of channels 10172 could be provided, if desired. The four groups of channels 10172 provide four groups of individual streams 1026. FIG. 11 discloses that not only can stream 1026 consist of multiple small streams of 1026 but that multiple streams 1026 can be arranged in groups having different shapes. This is advantageous when each group of multiple streams of 1026 is shaped like a propeller blade. If the four groups of streams 1026 of FIG. 10 are formed like four liquid propeller blades, then the groups of streams 1026 serve as a partial fan, in addition to the friction effect associated with the throat of the top section of funnel 1028, to move and to mix gas 1015 with the liquid 1026.

A group of stream 1026 can be formed in any desired shape by ending the end of each individual channel of the selected group in a different location. These ends can be progressively lower from one to the other, or progressively further around the disk rim from one to the other. Accordingly, a liquid propeller can be selectively formed that can either push or pull gas 1015.

FIG. 11 is a side view of a along the section line V—V of FIG. 10 showing disk 1080, siphon pipe 10150 and top funnel section 1028 with throat 1029. This drawing shows one way that propellers 11180 can be provided with channels 1128 to direct the liquid 1126 to desired positions relative to throat 1129.

In FIG. 11, funnel section 1128 is called a funnel because it serves the same purpose as funnels 128 and 228 in FIGS. 1 and 2. However, funnel 1128 in FIG. 11 is really a partition that serves as a check valve to the flow of mixture 1126 by forming a restricted area, throat 1129, between the wall of funnel 1128 and surface 1112 of the liquid. A gas cannot backflow through said throat 1129 due to the high velocity flow of stream 1126.

Disk 1180, which rotates counter-clockwise looking down, is attached to rotating shaft 1192, as shown. Cylinder 11150 has inlet-opening 11156 that is submerged below the surface 1112 of liquid 1113. Since opening 11156 is submerged, liquid flows through opening 11156 to the inside of the siphon pipe 11150 as shown by arrows 11160. And since the siphon pipe 11150 is rotating, liquid 1113 is centrifugally forced outward and upward as shown by arrow 1161. The liquid 11162 flows out of openings 11163 and on to the leading side of blades 11180. Openings 11163 in the wall of cylinder 11150 are in front of the leading side of the blades, in the direction of rotation of the cylinder, as shown by the near opening 11164. Blades 11180 are attached to disk 1180 and/or cylinder 11150 at an angle 11166, as shown, to push the gas downward. Blades 11180 are provided with channels, or grooves, 11172 to direct the flow of liquid below the top section of funnel 1128. Each individual end of each groove ends at a different location on the bottom portion of blades 11180, as shown, such that the combined stream of 1126 liquid is shaped like a propeller blade that flows through throat 1129 and impacts the surface of liquid 1113, submerging the mixture of gas and liquid.

Figure 12:
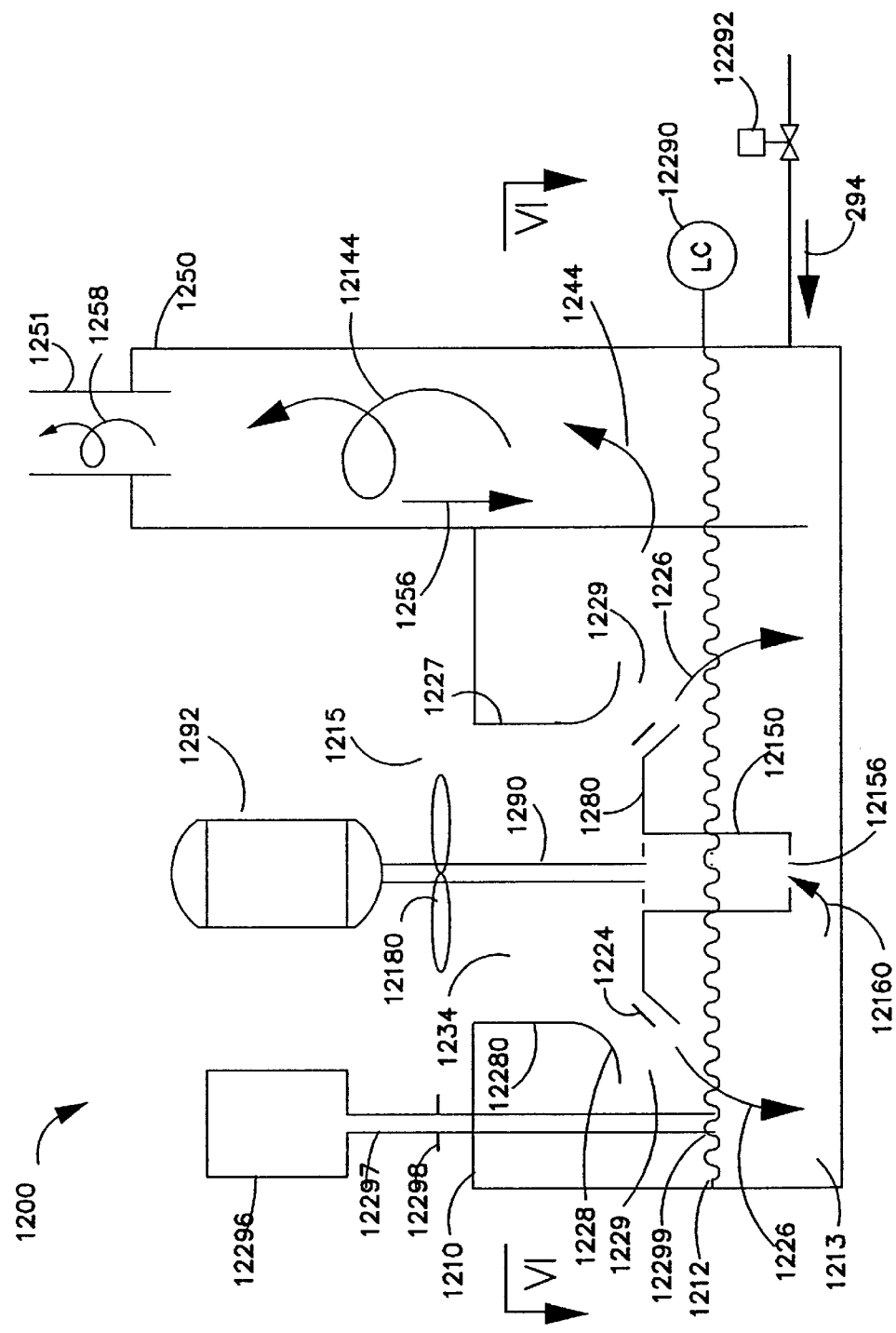
FIG. 12 is a schematic view of an embodiment the gas scrubber of the present invention intended for home use.

FIG. 12 is a schematic view of an embodiment the gas scrubber of the present invention, generally denoted by the numeral 1200, intended for home use. Container 1210 contains liquid 1213 which has surface 1212. Motor 1292 has shaft 1290 which is connected to disk 1280 having nozzle 1224 and siphon pipe or pump cylinder 12150 with inlet nozzle 12156 submerged, as shown. The top of container 1210 forms an opening 1234 which defined by interior walls 12280 that form funnel 1228 having throat 1229, as shown. Funnel 1228 serves as a partition for scrubber 1200 forming throat 1229, as previously explained for funnel 1128 of the apparatus of FIG. 11.

Container 1210 is in fluid connection to elongated section 1250, having outlet nozzle 1251, which serves as a cyclone to drop particulates and entrained liquids from the cleansed stream.

In operating the apparatus of FIG. 12, liquid 1213 inside of rotating siphon pipe 12150 flows through inlet nozzle 12156, as previously explained, and is centrifugally forced outward and up and out the top of cylinder 12150 and to the top of disk 1280. Disk 1280 centrifugally forces the liquid outwardly and through nozzle 1224. Nozzle 1224 is a converging nozzle that is directed downward such that the high velocity flow of liquid 1226 is also directed downward and is submerged beneath the surface 1212 of liquid 1213, as shown.

Figure 13:
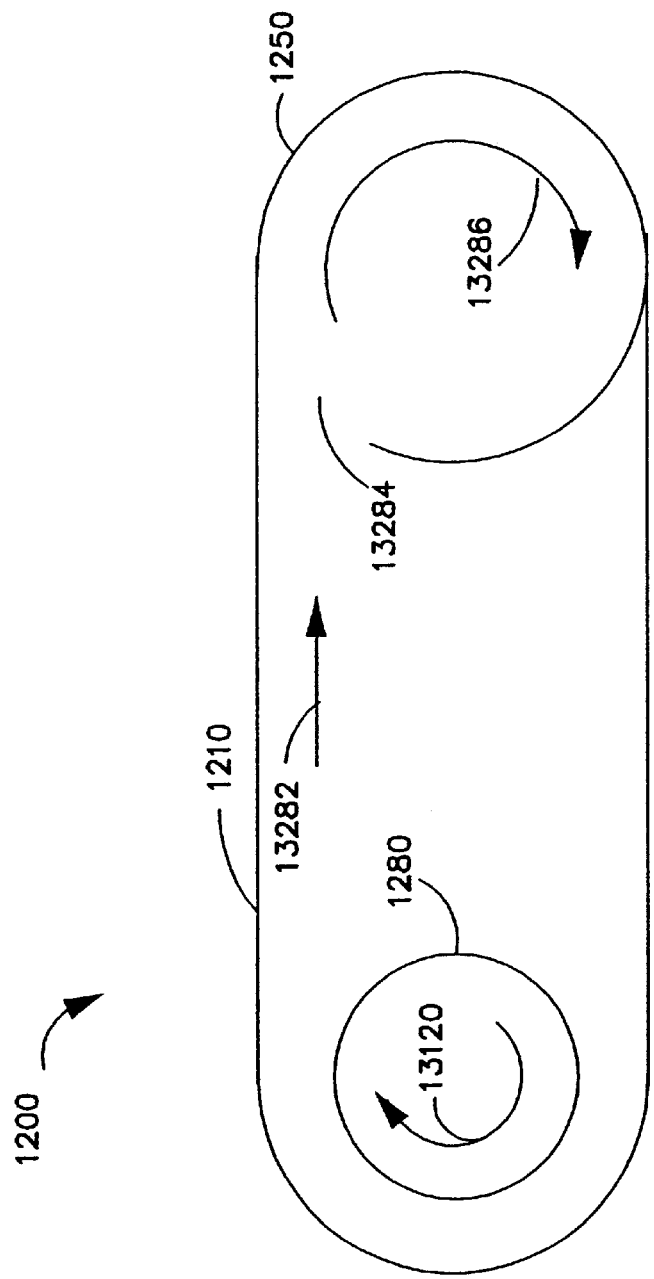
FIG. 13 is a view along section line VI—VI of FIG. 12.

FIG. 13 is a view of scrubber 1200 along section line VI—VI of FIG. 12. FIGS. 12 and 13 are further described in conjunction to one another. In FIG. 13, disk 1280 rotates in a clockwise direction as shown by arrow 13120. Accordingly, the liquid and the gas 1215 in the area of pump cylinder 12150 and disk 1280 also rotates in a clockwise direction. Since the pressure is higher on the inlet end of container 1210 than on the outlet end, the gas 1215 flows, as indicated by arrow 13282, tangentially through opening 13284, which is a partial opening in cylinder 1250 inside of container 1210, as shown by arrow 1244 in FIG. 12. Since the gas enters cylinder 1250 tangentially as shown, it rotates inside of cylinder 1250 in a clockwise direction as shown by arrow 13286 of FIG. 13 and arrow 12144 of FIG. 12. This rotation centrifugally forces the liquid mist and free liquid droplets to the inside wall of cylinder 1250 where they coalesce with any particulates that they contain and gravitate down to liquid 1213, as shown by arrow 1256 in FIG. 12. The gas rotates inside cylinder 1250 as shown by arrow 12144 of FIG. 12, and inside outlet cylinder 1251 as indicated by arrow 1258 and free of liquid mist and droplets, flows out of cylinder 1250.

If additional gas 1215 is desired to be processed by the apparatus 1200, optional propeller 12180 may be attached to shaft 1290, as shown, or squirrel cage type fan blades, not shown, may be attached to the top of nozzle 1224.

Nozzle 1224 is shown directed downward, however it can be the nozzle and blades 11180 of FIG. 11 or other nozzles like nozzle 924 with grooves 9172 like in FIG. 9.

It is not necessary to direct nozzle 1224 downward if nozzle 1224 is provided with relatively small grooves, like grooves 9172 in FIG. 9, and the disk is rotating at a relatively high revolution. This is because the very small streams of high velocity liquid quickly break up into small mist like droplets which scrub gas 1215 forced down through it by propeller 12180. In this case, the liquid stream 1226 should be greater than around 40 feet per second.

In using the apparatus of FIG. 12, or any of the apparatuses described herein, for home utilizing water, or a mixture containing water, to scrub the air, the air usually absorbs some of the water, so the apparatus also serves as a humidifier. In this case, it is necessary to continually add water as the apparatus is being used. According, level controller 12290 may be added to control valve 12292 which controls the addition of liquid to container 1210 as shown by arrow 294. The operation of controller 12290 and valve 12292 is well known by those familiar with the art and is not further described herein.

Also well known is the method of using a small vessel 12296 connected to an extension pipe 12297 extending into container 1210 through a seal 12298 and having an extended end 12299 positioned at the below surface level 1212 at a minimum level to allow surface 1212 to extend As surface level 1212 falls beneath extended end 12299, the vacuum in vessel 12296 is broken which allows fluid to gravitate from vessel 12296 through extension 12297 into container 1210 until extended end 12299 is submerged again. The vessel 12296 is refilled manually, as required.

Although the present invention and its advantages have been described in relation to the illustrated embodiments if should be understood that various changes, substitutions and alterations can be made herein without departing from the spirit and scope of the invention as defined by the appended claims. For example, it should be realized that various elements as described in the various embodiments can be combined in varying combinations to satisfy the invention as claimed. As demonstrated above, elements of the invention that are the same or similar in various figures are numbered in a manner to reflect the similarity while numbering elements to correspond to the particular figure referenced.

What is claimed is:

1. A gas scrubber for removing particulate and undesired gases from a gas stream, said scrubber comprising:

a container having a bottom wall and a top wall interconnected by a side wall for containing a liquid having a surface forming a space between said surface and said top wall;

a tube mounted through said top wall, said tube having a tube inlet opened exterior of said top wall connected via a throat to a tube outlet disposed in said space, said tube allowing a gas to flow from exterior said container into said space;

a motor having a rotatable shaft, said motor positioned above said top wall, said shaft extending through said tube;

a siphon pipe connected to said rotatable shaft, said siphon pipe having a siphon inlet disposed below said liquid surface and a siphon outlet positioned above said surface proximate said tube throat; wherein said rotating siphon pipe draws and rotates said liquid through said siphon pipe into said tube throat drawing said gas into said throat mixing with and scrubbing said gas; and a second opening formed through said container for discharging said scrubbed gas from said space exterior of said container.

2. The gas scrubber of claim 1, wherein said second opening is formed by a sleeve having a sleeve outlet disposed exterior of said container and a sleeve inlet positioned within said space wherein said scrubbed gas enters said sleeve through said sleeve inlet tangentially causing circular flow through said sleeve coalescing said liquid on an inside wall of said sleeve, said coalesced liquid gravitating to said liquid surface.

3. The gas scrubber of claim 1, further including a rotatable fan wheel attached to said shaft, said fan wheel positioned proximate said tube inlet to introduce additional gas through said tube and into said tube throat.

4. The gas scrubber of claim 2, further including a rotatable fan wheel attached to said shaft, said fan wheel positioned proximate said tube inlet to introduce additional gas through said tube and into said tube throat.

5. The gas scrubber of claim 1, further including a screw propeller attached to said shaft to rotate therewith, said propeller having blades, each said having a top leading edge and a bottom trailing edge interconnected by a face with said top leading edge positioned proximate said tube inlet for introducing additional gas down said face into said tube throat.

6. The gas scrubber of claim 2, further including a screw propeller attached to said shaft to rotate therewith, said propeller having blades, each said having a top leading edge and a bottom trailing edge interconnected by a face with said top leading edge positioned proximate said tube inlet for introducing additional gas down said face into said tube throat.

7. The gas scrubber of claim 1, further including blades attached to a top, outside portion of said siphon pipe, each of said blades having a top leading edge and a bottom trailing edge interconnected by a face that tangentially encircles said siphon pipe; said top leading edge positioned proximate said tube inlet and said bottom trailing edge positioned proximate said throat; said siphon pipe outlet positioned proximate the top leading edge of each said blade such that said liquid flowing out of said siphon pipe outlet flows across said face and said rotating face forces said gas and said liquid down said face to mix said liquid and said gas and forcing said mixture down and centrifugally off said trailing edges through said throat to further mix and scrub said gas with said liquid in said throat.

8. The gas scrubber of claim 7, wherein said faces include vertical grooves.

9. The gas scrubber of claim 1, further including blades attached to a top, outside portion of said siphon pipe, each of said blades having a top leading edge and a bottom trailing edge interconnected by a face that tangentially encircles said siphon pipe; said top leading edge positioned proximate said tube inlet and said bottom trailing edge positioned proximate said throat; said siphon pipe outlet positioned proximate the top leading edge of each said blade such that said liquid flowing out of said siphon pipe outlet flows across said face and said rotating face forces said gas and said liquid down said face to mix said liquid and said gas and forcing said mixture down and centrifugally off said trailing edges through said throat to further mix and scrub said gas with said liquid in said throat.

10. The gas scrubber of claim 9, wherein said faces include vertical grooves.

11. A gas scrubber for removing particulate and undesired gases from a gas stream, said scrubber comprising:

a container having a bottom wall and a top wall interconnected by a side wall for containing a liquid having a surface forming a space between said surface and said top wall;

a tube mounted through said top wall, said tube having a tube inlet opened exterior of said top wall connected via a throat to a tube outlet disposed in said space, said tube allowing a gas to flow from exterior said container into said space;

a motor having a rotatable shaft, said motor positioned above said top wall, said shaft extending through said tube;

a siphon pipe connected to said rotatable shaft, said siphon pipe having a siphon inlet disposed below said liquid surface and a siphon outlet positioned above said surface proximate said tube throat, said siphon outlet being larger than said siphon inlet; wherein said rotating siphon pipe draws and rotates said liquid through said siphon pipe into said tube throat drawing said gas into said throat mixing with and scrubbing said gas; and a second opening formed through said container for discharging said scrubbed gas from said space exterior of said container.

12. The gas scrubber of claim 11, wherein said second opening is formed by a sleeve having a sleeve outlet disposed exterior of said container and a sleeve inlet positioned within said space wherein said scrubbed gas enters said sleeve through said sleeve inlet tangentially causing circular flow through said sleeve coalescing said liquid on an inside wall of said sleeve, said coalesced liquid gravitating to said liquid surface.

13. The gas scrubber of claim 11, further including a rotatable fan wheel attached to said shaft, said fan wheel positioned proximate said tube inlet to introduce additional gas through said tube and into said tube throat.

14. The gas scrubber of claim 12, further including a rotatable fan wheel attached to said shaft, said fan wheel positioned proximate said tube inlet to introduce additional gas through said tube and into said tube throat.

15. The gas scrubber of claim 11, further including a screw propeller attached to said shaft to rotate therewith, said propeller having blades, each said having a top leading edge and a bottom trailing edge interconnected by a face with said top leading edge positioned proximate said tube inlet for introducing additional gas down said face into said tube throat.

16. The gas scrubber of claim 12, further including a screw propeller attached to said shaft to rotate therewith, said propeller having blades, each said having a top leading edge and a bottom trailing edge interconnected by a face with said top leading edge positioned proximate said tube inlet for introducing additional gas down said face into said tube throat.

17. The gas scrubber of claim 11, further including blades attached to a top, outside portion of said siphon pipe, each of said blades having a top leading edge and a bottom trailing edge interconnected by a face that tangentially encircles said siphon pipe; said top leading edge positioned proximate said tube inlet and said bottom trailing edge positioned proximate said throat; said siphon pipe outlet positioned proximate the top leading edge of each said blade such that said liquid flowing out of said siphon pipe outlet flows across said face and said rotating face forces said gas and said liquid down said face to mix said liquid and said gas and forcing said mixture down and centrifugally off said trailing edges through said throat to further mix and scrub said gas with said liquid in said throat.

18. The gas scrubber of claim 17, wherein said faces include vertical grooves.

19. The gas scrubber of claim 11, further including blades attached to a top, outside portion of said siphon pipe, each of said blades having a top leading edge and a bottom trailing edge interconnected by a face that tangentially encircles said siphon pipe; said top leading edge positioned proximate said tube inlet and said bottom trailing edge positioned proximate said throat; said siphon pipe outlet positioned proximate the top leading edge of each said blade such that said liquid flowing out of said siphon pipe outlet flows across said face and said rotating face forces said gas and said liquid down said face to mix said liquid and said gas and forcing said mixture down and centrifugally off said trailing edges through said throat to further mix and scrub said gas with said liquid in said throat.

20. The gas scrubber of claim 19, wherein said faces include vertical grooves.

* * * * *